United States Patent [19]

Teramachi

[11] 4,376,557
[45] Mar. 15, 1983

[54] LINEAR BALL BEARING

[76] Inventor: Hiroshi Teramachi, 34-8, Higashi-Tamagawa 2-chome, Setagaya-ku, Tokyo, Japan, 158

[21] Appl. No.: 325,649

[22] Filed: Nov. 30, 1981

[30] Foreign Application Priority Data

Feb. 23, 1981 [JP] Japan ................... 56-24358

[51] Int. Cl.³ .......................................... F16C 29/06
[52] U.S. Cl. .................... 308/6 C; 308/6 R
[58] Field of Search .............. 308/6 C, 6 R, 3 R, 6 A, 308/3 A, 217

[56] References Cited

U.S. PATENT DOCUMENTS

| 2,576,269 | 11/1951 | Thomson | 308/6 C |
| 3,751,121 | 8/1973 | Geffner | 308/6 C |
| 3,944,307 | 3/1976 | Bingle | 308/217 |
| 4,253,709 | 3/1981 | Teramachi | 308/6 C |

Primary Examiner—Stuart S. Levy
Assistant Examiner—David Werner
Attorney, Agent, or Firm—George B. Oujevolk

[57] ABSTRACT

An improved linear ball bearing is disclosed which essentially comprises a bearing casing and a pair of retainer and side cover assemblies. The last mentioned assembly consists of a retainer half and a side cover and the two members are integrally secured to one another. On the inner end face of the side cover are formed U-shaped ball movement direction reversing grooves which are located corresponding to loading ball guiding grooves and non-loading ball guiding holes. The retainer half contains horizontal member, inclined members and lower holding members each of which is protruded from the inner end face of the side cover toward those of the opposite side cover. Between the adjacent concave end faces of these members are formed loading ball guides of which inner diameter is substantially same to the outer diameter of rolling balls and which are arranged so as not to cause any falling-down of the balls therefrom. The members of the respective retainer halves are dimensioned exactly to one half of the length of the bearing casing. One of the inclined members and lower holding members has engagement pins at the end thereof, while the other one has engagement holes at the end face thereof to receive the corresponding engagement pins.

4 Claims, 3 Drawing Figures

LINEAR BALL BEARING

FIELD OF THE INVENTION

The present invention relates to a linear ball bearing which essentially comprises a bearing casing and a pair of retainer and side cover assemblies, said bearing casing being formed with ball guiding grooves and holes which are symmetrically arranged to guide a row of rolling balls, while said assemblies having a retainer half integrally secured to the side cover, and more particularly relates to an improved linear ball bearing having four lines of loading ball guiding grooves formed on the upper wall and inclined side walls of a considerably large recess having a substantially trapezoidal sectional configuration as well as four lines of non-loading ball guiding holes drilled through the bearing casing in the longitudinal direction and located at a predetermined distance radially from said loading ball guiding grooves in parallel to the same. Specifically, the linear ball bearing of the present invention is constructed such that the retainer and side cover assembly comprises a retainer half and a side cover and the side cover has four lines of U-shaped ball movement direction reversing grooves formed on the inner end face thereof, said U-shaped ball movement direction reversing grooves being located corresponding to the loading ball guiding grooves and non-loading ball guiding holes, while the retainer half contains a horizontal member, inclined members and lower holding members each of which is protruded from the end face of the side cover toward those of the opposite retainer half in such a manner that said U-shaped ball movement direction reversing grooves extent intermediate the adjacent members among the above-described ones. Further, the linear ball bearing is constructed such that the horizontal member, inclined members and lower holding members of the respective retainer halves have concave end faces so as to form four lines of loading ball guides therebetween of which inner diameter is substantially same to the outer diameter of rolling balls and which are arranged so as not to cause any fallingdown of the loading balls therefrom, the respective retainer halves are dimensioned exactly to one half of the length of the bearing casing, and further one of the inclined members and lower holding members has engagement pins at their end faces, while the other one of them has engagement holes at their end faces to receive the corresponding pins therein.

BACKGROUND OF THE INVENTION

The hitherto known linear ball bearing is usually constructed such that side covers and retainer are separately manufactured and then assembled onto a bearing casing (c.f. U.S. Pat. No. 4,253,709).

The conventional retainer is made of steel plate by press working in such a manner that a plurality of longitudinally extending slits are punched out at predetermined positions and at the same time considerably small tongue pieces are projected out at both the ends of the respective slits for the purpose of ensuring scooping function for the rolling balls. To meet this requirement it is necessary that the tongue pieces have high mechanical strength and wear resistance.

For the reason the conventional retainer is made of steel plate having excellent rigidity and resiliency and after completion of press working it is subjected to heat treatment, which causes it to be manufactured at an expensive cost.

SUMMARY OF THE INVENTION

Thus, it is a principal object of the present invention to provide an improved linear ball bearing without any of the drawbacks inherent to the conventional one as described above which is constructed in an integrally molded structure in the form of a side cover and retainer assembly using heat resistant plastic material in which a plurality of loading ball guides are formed through the retainer half and which provides a wide and successive supporting area as well as scooping function for rolling balls without any particular necessity for mechanical strength and rigidity of the retainer half.

It is other object of the present invention to provide a linear ball bearing which ensures smooth movement of the balls irrespective of an appreciable dislocation of the retainer halves at their joint part owing to the arrangement that the rolling balls are not brought in tight contact with the inner wall of the ball guides in the retainer half.

It is another object of the present invention to provide a linear ball bearing which is easy to be assembled and is manufactured at a reduced cost under an improved working condition owing to the fact that the retainer and side cover assemblies are integrally constructed using plastic material or non-ferrous metallic material which is easily molded or cast to the required configuration.

To satisfactorily accomplish the above objects there is proposed in accordance with a linear ball bearing which essentially comprises a bearing casing and a pair of retainer and side cover assemblies which have a symmetrical configuration and are secured to the end face of said bearing casing, said bearing casing having four lines of loading ball guiding grooves formed on the upper wall and inclined side walls of a considerably large recess having a substantially trapezoidal sectional configuration as well as four lines of non-loading ball guiding holes drilled through the bearing casing in the longitudinal direction in position at a predetermined distance radially from said loading ball guiding grooves in parallel to the latter, said loading ball guiding grooves and non-loading ball guiding holes having the substantially same radius of curvature as diameter of rolling balls, while said retainer and side cover assemblies comprising a retainer half and a side cover respectively, characterized in that the side cover has four lines of U-shaped ball movement direction reversing grooves formed on the inner end face thereof, said U-shaped ball movement direction reversing grooves being located corresponding to the loading ball guiding grooves and non-loading ball guiding holes, while the retainer half contains a horizontal member, inclined members and lower holding members each of which is protruded from the end face of the side cover toward those of the opposite retainer half in such a manner that the U-shaped ball movement direction reversing grooves radially extend intermediate the adjacent members among the above ones, wherein the horizontal member, inclined members and lower holding members of the respective retainer halves have concave end faces so as to form four lines of loading ball guides therebetween of which inner diameter is substantially same to the outer diameter of the rolling balls and which are arranged so as not to cause any falling-down of the loading balls therefrom, the respective retainer halves are dimensioned exactly to one half of the length of the bearing casing, and further one of the inclined members and lower holding members has engagement pins at their end faces, while the other one of them has engagement holes at their end faces to receive the corresponding engagement pins therein.

Other objects and advantageous features of the present invention will be apparent from the reading of the following description made with reference to the accompanying drawings which illustrate a preferred embodiment of the invention.

BRIEF DESCRIPTION OF THE ACCOMPANYING DRAWINGS

DETAILED DESCRIPTION OF THE INVENTION

Figure 1:
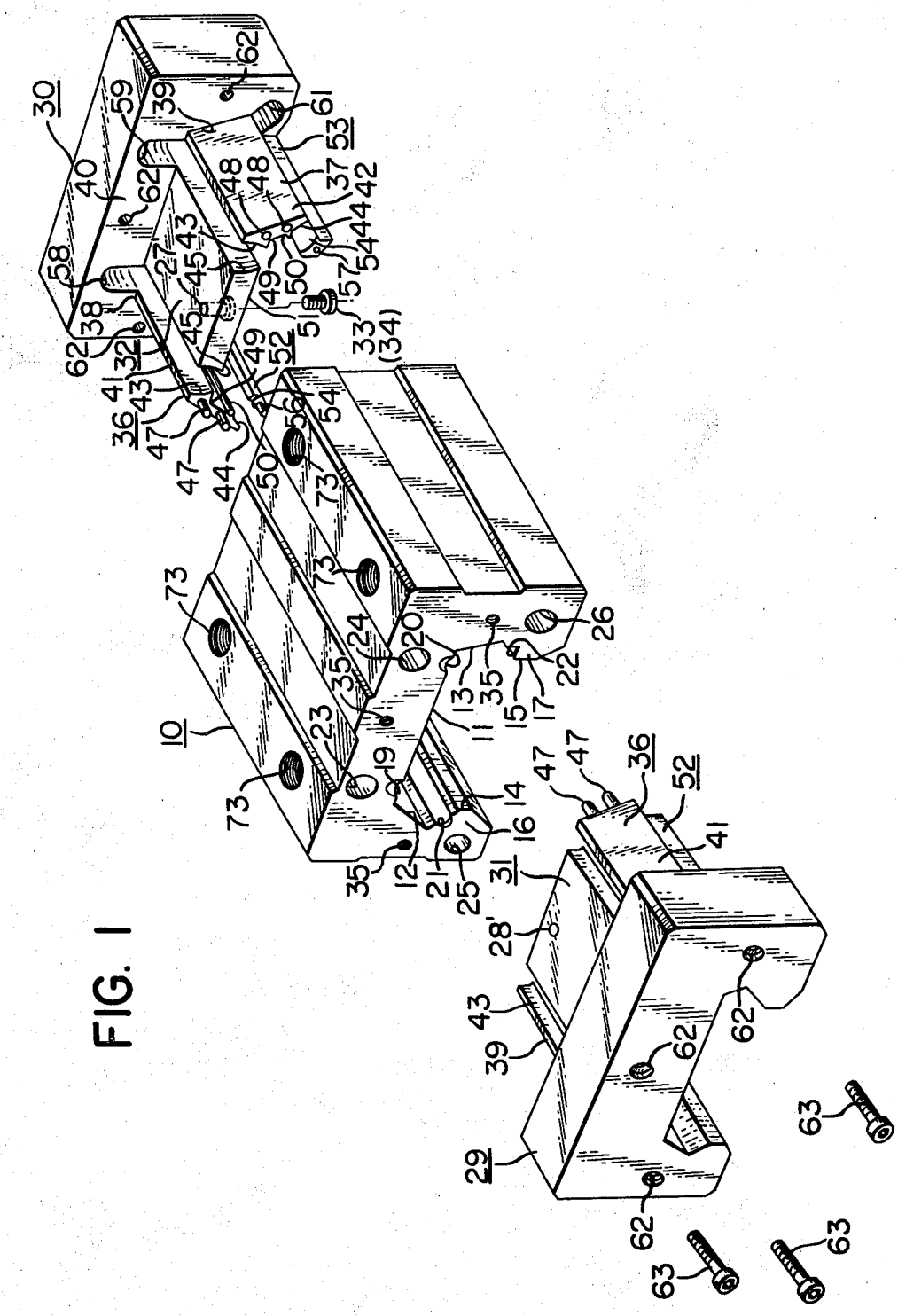
FIG. 1 is a perspective view of a linear ball bearing in accordance with the present invention, shown in a disassembled state.

Now the present invention will be described in more detail with reference to the drawings as follows. It is to be noted that the terms "loading ball" and "non-loading ball" are intended to represent the operating conditions of rolling balls and they should be identified by a so-called bearing ball.

Reference numeral 10 designates a bearing casing made of steel material. As is apparent from the drawing, the bearing casing 10 has a geometrical configuration in the form of a parallepiped and is provided with a considerably large recess having a substantially trapezoidal sectional shape, wherein said recess comprises an upper wall 11, inclined side walls 12 and 13 and open end faces 14 and 15 inwardly raised at portions 16 and 17 (see FIG. 1).

Further, said upper wall 11 has longitudinally extending grooves 19 and 20 having the substantially same radius of curvature as diameter of rolling balls, said grooves 19 and 20 being located in the vicinity of both ends of the upper wall 11, while said inclined side walls 12 and 13 have also a longitudinally extending groove identified by reference numerals 21 and 22 having the substantially same radius of curvature as the diameter of rolling balls, said grooves 21 and 22 being located at the lower part of the inclined side walls 12 and 13, whereby four ball rows (containing four lines of longitudinally extending grooves for loading balls) are symmetrically arranged on the inner walls of the bearing casing 10.

Reference numerals 23 and 24 designate non-loading ball guiding holes which extend through the bearing casing 10 at a predetermined distance from the loading ball guiding grooves 19 and 20 on the upper wall 11 in parallel to the latter.

Reference numerals 25 and 26 designate another non-loading ball guiding holes which extend also through the bearing casing 10 at a predetermined distance radially downward of the loading ball guiding grooves 21 and 22 in parallel to the latter (see FIG. 1).

Reference numerals 27 and 28 designate a threaded hole for a set screw respectively. Said threaded holes 27 and 28 are provided in a spaced relation on the center line of the upper wall 11 of the bearing casing 11 and receive set screws 33 and 34 which are inserted through drilled holes 27' and 28' on horizontal members 31 and 32 which are an integral extension from side covers 29 and 30, said set screws 33 and 34 being inserted and tightened after the horizontal members 31 and 32 come in abutment against one another at their end faces.

Reference numeral 35 designates a threaded hole provided on the end faces of the bearing casing 10, into which a set screw is tightened for firmly securing the side covers 29 and 30 thereto. The horizontal members 31 and 32 which serve as a part of a retainer have an outer concave end face 45 at both sides thereof, said end face 45 having the substantially same radius of curvature as the diameter of rolling balls.

Figure 2:
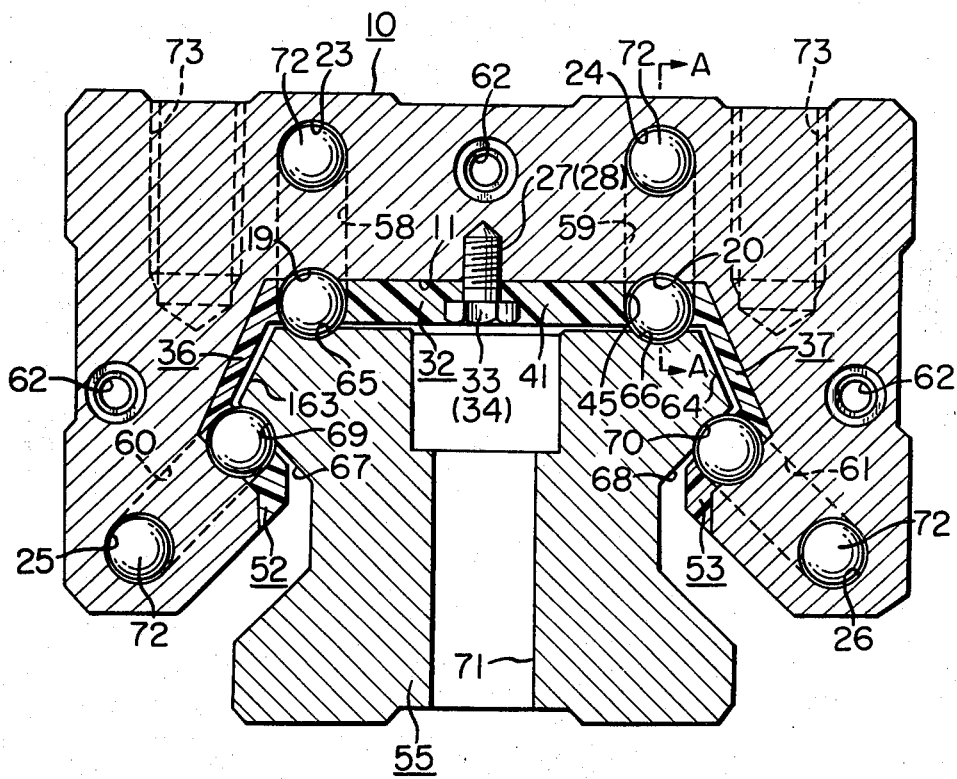
FIG. 2 is a cross-sectional view of the linear ball bearing in FIG. 1 slidably mounted on a track shaft.
Figure 3:
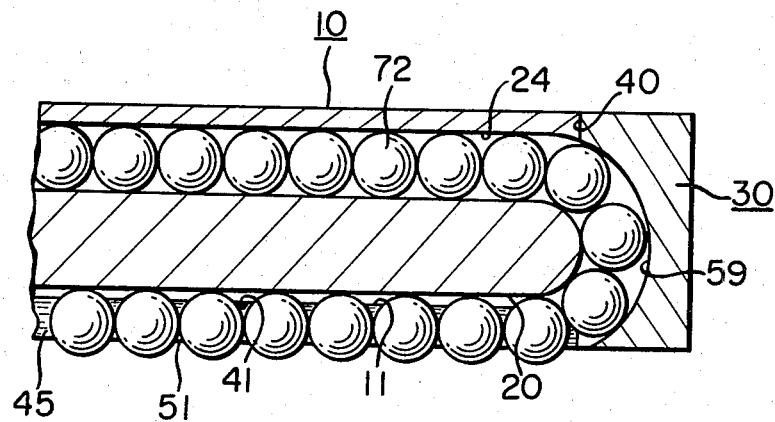
FIG. 3 is a partial sectional view of the linear ball bearing taken in line A—A in FIG. 2, shown in an enlarged scale.

Reference numerals 36 and 37 designate inclined members which are another integral extension of the side covers 29 and 30. Said inclined members 36 and 37 have bottom ends 38 and 39 which are integrally secured to the inner end face 40 of the respective side covers 29 and 30, and they are longitudinally protruded therefrom. Further, they have outer inclined faces 41 and 42 of which width is dimensioned exactly same to that of the inner inclined walls 12 and 13 of the bearing casing 10, whereas they have upper and lower concave faces 43 and 44 which are symmetrically located opposite to the outer concave faces 45 of the horizontal members 31 and 32. It is to be noted that the radius of curvature of the respective concave faces 43, 44 and 45 is dimensioned such that there is no danger of falling-down of any of rolling balls even when a track rail 55 is removed in the longitudinal direction (see FIGS. 1 and 2).

Reference numeral 47 designates an engagement pin which is located at the right side seen toward the end face of the bearing casing 10. Said engagement pins 47 are protruded from the end face of the inclined member 36, whereas drilled holes 48 are provided in the opposite inclined member 37 to receive them.

Reference numerals 49 and 50 designate upper and lower cornered portions formed intermediate the upper and lower concave faces 43 and 44, wherein the upper cornered portion 43 is flush with the lower face 51 of the horizontal members 31 and 32 and the lower cornered portion 50 has a downward inclination.

Reference numerals 52 and 53 designate lower holding members which are also another integral extension of the side covers 29 and 30. Said lower holding members 52 and 53 are longitudinally protruded from the end face 40 of the side covers 29 and 30 in the same manner as the inclined members 36 and 37. Further, they have an upper concave face 54 which is symmetrically located opposite to the lower concave face 44, wherein said concave faces 44 and 54 are dimensioned such that no rolling ball falls down when the track rail 55 is removed in the longitudinally direction.

Reference numeral 56 designates an engagement pin which is longitudinally protruded from the end face of the lower holding members 52 and 53 to be received in a corresponding drilled hole 57 on the end face of the bearing casing 10.

Reference numerals 58, 59, 60 and 61 designate an U-shaped ball movement direction reversing groove respectively each of which is formed on the end face 40 of the side covers 29 and 30 by machining. Among them the U-shaped grooves 58 and 59 are located between the side concave faces 45 of the horizontal members 31 and 32 and the upper concave faces 43 of the inclined members 36 and 37, while the U-shaped grooves 60 and 61 are located between the lower concave faces 44 of the inclined members 36 and 37 and the upper concave faces 54 of the lower holding members 52 and 53. It is to be added that the U-shaped grooves 58 and 59 extends in the vertical direction such that they are located in alignment with the loading ball guiding grooves 19 and 20 as well as the non-loading ball guiding holes 23 and 24, while the U-shaped grooves 60 and 61 extend in the downwardly inclined direction such that they are located in alignment with the loading ball guiding grooves 21 as well as the non-loading ball guiding holes 25 and 26 in the bearing casing 10.

The side cover 30 and its associated members are constructed and arranged symmetrically relative to the side cover 29.

Reference numeral 62 designates a drilled hole through which a fitting bolt 63 is inserted and screwed into a threaded hole 35 provided on the end face of the bearing casing 10 so that the assemblies of the side covers 29 and 30 with the retainer means are firmly secured to the bearing casing 10.

Reference numeral 55 designates a track rail which is adapted to be slidably incorporated through the linear ball bearing of the invention, having a X-shaped cross-sectional configuration. Said track rail 55 has raised portions 163 and 64 at the both sides of the upper part thereof, said raised portions 163 and 64 extending in the longitudinal direction and being formed with loading ball guiding grooves 65 and 66 located in the vicinity of both ends of the upper surface corresponding to the loading ball guiding grooves 19 and 20 on the inner upper wall 11 in the bearing casing 10 as well as with another loading ball guiding grooves 69 and 70 located at the bottom of the raised portions 163 and 64 corresponding to the loading ball guiding grooves 21 and 22 on the inclined side walls 12 and 13 in the bearing casing 10. The respective loading ball guiding grooves 65, 66, 69 and 70 have the substantially same radius of curvature as the diameter of the rolling balls (see FIG. 2).

Reference numeral 71 designates a fitting hole which is intended to fixedly mount the track rail 55 on a moving part or stationary part of a machine, equipment, apparatus or the like such as machine tool by tightening a fitting bolt (not shown) inserted through said fitting hole. Further, reference numeral 73 designates a threaded hole which is intended to firmly set the bearing casing 10 to a table of a machine tool or the like by screwing a fitting bolt (not shown) into said threaded hole.

The members or components for the linear ball bearing of the invention are designed and constructed as described above. Now a description will be made below as to how they are assembled.

First, the retainer half of the retainer and side cover assembly 30 is inserted into the bearing casing 10 and then is fixed thereto by means of the bolts 63. Thereafter the horizontal member 32 of the retainer is firmly secured to the upper wall 11 of the bearing casing 10 by means of the set screw 33 inserted through the drilled hole 27'.

Next, a number of balls 46 are charged into the bearing casing 10 through the respective non-loading ball guiding holes 23 to 26, until the loading ball holding passages in the retainer, the U-shaped ball movement direction reversing grooves 58 to 61 and the non-loading ball guiding holes 23 to 26 are filled with the charged balls.

On the other hand, the retainer and side cover assembly 29 is charged with another balls 46 and thereafter it is inserted into the bearing casing 10 with the engagement pins 47 being fitting into the engagement holes 48 on the retainer of the other assembly 29. At the same time the engagement pins 47 on the retainer of the other assembly 29 are fitted into the engagement holes 48 on the retainer of the one assembly 30.

Finally, the retainer and side cover assembly 29 is firmly secured to the bearing casing 10 by means of the bolts 63 inserted through the fitting holes 62.

Since the linear ball bearing of the invention is constructed in the above-described manner, it is ensured that as the linear ball bearing slidably mounted on a track rail moves forward and backward, loading balls held in the loading ball guiding grooves on the bearing casing and track rail are smoothly displaced into the non-loading ball guiding holes in the bearing casing via the U-shaped ball movement direction reversing grooves owing to the wide supporting area provided by the retainers as well as the scooping function through the U-shaped ball movement direction reversing grooves.

What is claimed is:

1. A linear ball bearing comprising a bearing casing and a pair of retainer and side cover assemblies which have a symmetrical configuration and are secured to the end face of said bearing casing, said bearing casing having four lines of loading ball guiding grooves formed on an upper wall and inclined side walls of a considerably large recess having a substantially trapezoidal cross-sectional configuration and four lines of non-loading ball guiding holes drilled through the bearing casing in the longitudinal direction located at a predetermined distance radially from said loading ball guiding grooves and in parallel to the loading ball guiding grooves, said loading ball guiding grooves and non-loading ball guiding holes having the substantially same radius of curvature as the diameter of a plurality of rolling balls located in the ball guides, while said retainer and side cover assemblies. comprising a retainer half and a side cover respectively, characterized in that the side cover has four lines of U-shaped ball movement direction reversing grooves formed on an inner end face thereof, said U-shaped ball movement direction reversing grooves being located corresponding to the loading ball guiding grooves and non-loading ball guiding holes, said retainer half containing a horizontal member, inclined members and lower holding members each of which is protruded from the end face of the side cover toward those of the opposite retainer half in such a manner that the U-shaped ball movement direction reversing grooves radially extend intermediate to the adjacent members, wherein the horizontal member, inclined members and lower holding members of the respective retainer halves have concave end faces so as to form four lines of loading ball guides therebetween of which inner diameter is substantially the same as the diameter of the rolling balls and which include means for preventing any falling-down of the loading balls therefrom, the respective retainer halves are dimensioned exactly to one half of the length of the bearing casing, one of the inclined members and lower holding members has engagement pins at their end faces, and the end faces of the opposite inclined member having engagement holes to receive the corresponding engagement pins therein.

2. A linear ball bearing as defined in claim 1, characterized in that the retainer and side cover assembly is made of plastic material or non-ferrous metallic material, which has excellent heat resistance and wearing resistance and can be molded or cast to the required configuration.

3. A linear ball bearing as defined in claim 1, characterized in that the inclined members and lower holding members of the respective retainer and side cover assemblies are symmetrically arranged.

4. A linear ball bearing as defined in claim 1, characterized in that the horizontal member of the respective retainer and side cover assemblies is fixedly secured to the upper wall of the recess in the bearing casing by means of a set screw.

* * * * *